(12) United States Patent
Cazeaux et al.

(10) Patent No.: US 11,187,190 B2
(45) Date of Patent: Nov. 30, 2021

(54) TURBOFAN COMPRISING A CAM ACTUATING A SET OF ROTATABLE BLADES FOR BLOCKING OFF THE BYPASS FLOW DUCT

(71) Applicant: Airbus Operations SAS, Toulouse (FR)

(72) Inventors: Laurent Cazeaux, Toulouse (FR); Antoine Boudou, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 16/926,973

(22) Filed: Jul. 13, 2020

(65) Prior Publication Data

US 2021/0017935 A1 Jan. 21, 2021

(30) Foreign Application Priority Data

Jul. 15, 2019 (FR) ...................................... 1907966

(51) Int. Cl.
*F02K 1/72* (2006.01)
*F02K 1/76* (2006.01)

(52) U.S. Cl.
CPC ................ *F02K 1/72* (2013.01); *F02K 1/763* (2013.01); *F05D 2220/323* (2013.01)

(58) Field of Classification Search
CPC ....... F02K 1/72; F02K 1/763; F05D 2220/323
See application file for complete search history.

(56) References Cited

U.S. PATENT DOCUMENTS

| | | | |
|---|---|---|---|
| 2,933,890 A | 4/1960 | Morrison | |
| 10,830,089 B2 * | 11/2020 | Gardes | .................. F01D 17/167 |
| 2015/0176529 A1 * | 6/2015 | Todorovic | ................. F02K 1/72 |
| | | | 239/265.19 |
| 2016/0201601 A1 * | 7/2016 | Nakhjavani | ............. F02K 1/763 |
| | | | 239/1 |
| 2017/0198658 A1 | 7/2017 | Higgins | |
| 2017/0342941 A1 * | 11/2017 | Mears | ....................... F02K 1/72 |
| 2020/0031485 A1 | 1/2020 | Kerbler et al. | |
| 2020/0240359 A1 * | 7/2020 | Gardes | .................... F16H 25/18 |

FOREIGN PATENT DOCUMENTS

FR 3059646 A1 6/2018

OTHER PUBLICATIONS

French Search Report; priority document.

* cited by examiner

*Primary Examiner* — Lorne E Meade
(74) *Attorney, Agent, or Firm* — Greer, Burns & Crain, Ltd.

(57) ABSTRACT

A turbofan having a nacelle comprising a slider being mobile in translation between an advanced position and a retracted position to open a window between a duct and the exterior, a plurality of blades, each one being mobile in rotation on the slider between a stowed position and a deployed position, and a maneuvering system that moves each blade. The maneuvering system comprises, for each blade, a shaft being mobile in rotation on the slider and on which the blade is fixed, a toothed sector being fixed to the shaft, a toothed arc being mobile in rotation on the slider, and having a bearing face, a threaded rod mounted fixed on the fixed structure, a cam having a tapped hole screwed onto the threaded rod and mounted fixed in translation with respect to the slider, and a return arrangement that presses the bearing face against the cam outer surface.

6 Claims, 4 Drawing Sheets

TURBOFAN COMPRISING A CAM ACTUATING A SET OF ROTATABLE BLADES FOR BLOCKING OFF THE BYPASS FLOW DUCT

CROSS-REFERENCES TO RELATED APPLICATIONS

This application claims the benefit of the French patent application No. 1907966 filed on Jul. 15, 2019, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage to each side of which is fixed a wing. Under each wing is suspended at least one turbofan. Each turbofan is fixed under the wing by means of a pylon fixed between the structure of the wing and the structure of the turbofan.

The turbofan comprises a motor and a nacelle that is fixed around the motor. The turbofan has, between the nacelle and the motor, a bypass duct in which a bypass flow flows.

The nacelle comprises a plurality of reversal doors, each one being mobile in rotation on the structure of the nacelle, between a stowed position in which it is outside the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust. Moreover, each reversal door is moved using a connecting rod which crosses the bypass duct in the stowed position and which thus partially blocks the bypass duct.

Although the reversal doors are entirely satisfactory, it is desirable to find different mechanisms, in particular mechanisms which are more lightweight and which in no way obstruct the bypass flow when in the stowed position.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising a motor and a nacelle, surrounding the motor, which comprises a fan casing, in which a duct for a bypass flow is delimited between the nacelle and the motor and in which a flow of air flows in a flow direction, the nacelle comprising:
  a fixed structure fixed to the fan casing,
  a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and an extended position in which the slider is positioned such that the mobile cowl is moved away from the fan casing so as to define, between them, an open window between the bypass duct and the exterior of the nacelle,
  a plurality of blades, each one comprising a first end mounted so as to be mobile in rotation on the slider about an axis of rotation, and where the blades are angularly offset from one to the next about the longitudinal axis, where each blade is mobile between a stowed position in which the blade is outside the duct and a deployed position in which the blade is across the duct,
  an assembly of actuators causing the slider to move between the advanced position and the extended position, and vice versa, and
  a maneuvering system intended to move each blade from the stowed position to the deployed position and vice versa, where the maneuvering system comprises:
  for each blade, a shaft mounted so as to be mobile in rotation on the slider about an axis of rotation, and on which the blade is fixed,
  for each shaft, a toothed sector that is fixed to the shaft and is coaxial with the axis of rotation,
  a toothed arc that is coaxial with the longitudinal axis, mounted so as to be mobile in rotation on the slider about the longitudinal axis, where the teeth of the toothed arc mesh with the teeth of each toothed sector, and where the toothed arc has a bearing face,
  a threaded rod whose axis is parallel to the longitudinal axis and which is mounted fixed on the fixed structure,
  a cam having a tapped hole screwed onto the threaded rod and an outer face, where the cam is mounted fixed in translation with respect to the slider, and where the outer surface of the cam bears against the bearing face, and
  a return means which presses the bearing face of the toothed arc against the outer surface of the cam.

An engine of this kind permits a reduction in mass by replacing the reversal doors and their drive mechanisms with more lightweight pivoting blades having a simplified maneuvering system.

Advantageously, the return means is a tension spring which is fixed between the toothed arc and the slider.

Advantageously, the toothed arc is equipped with a roller that is mounted so as to be able to rotate freely on the toothed arc about an axis parallel to the longitudinal axis and that is arranged so as to roll on the outer face of the cam when the latter moves in rotation.

According to one particular embodiment, the turbofan comprises an upstream contact and a downstream contact that are secured to the slider, and the upstream contact bears in planar fashion against a front face of the cam and the downstream contact bears in planar fashion against a rear face of the cam.

According to another particular embodiment, the turbofan comprises an upstream thrust ball bearing that bears in planar fashion against a front face of the cam and a downstream thrust ball bearing that bears in planar fashion against a rear face of the cam, each thrust ball bearing is secured to the slider, and each thrust ball bearing is threaded onto the threaded rod.

The invention also proposes an aircraft comprising at least one turbofan according to one of the preceding variants.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

In the following description, the terms relating to a position refer to the direction of flow of the air in an engine which therefore flows from the front to the rear of the aircraft.

Figure 1:
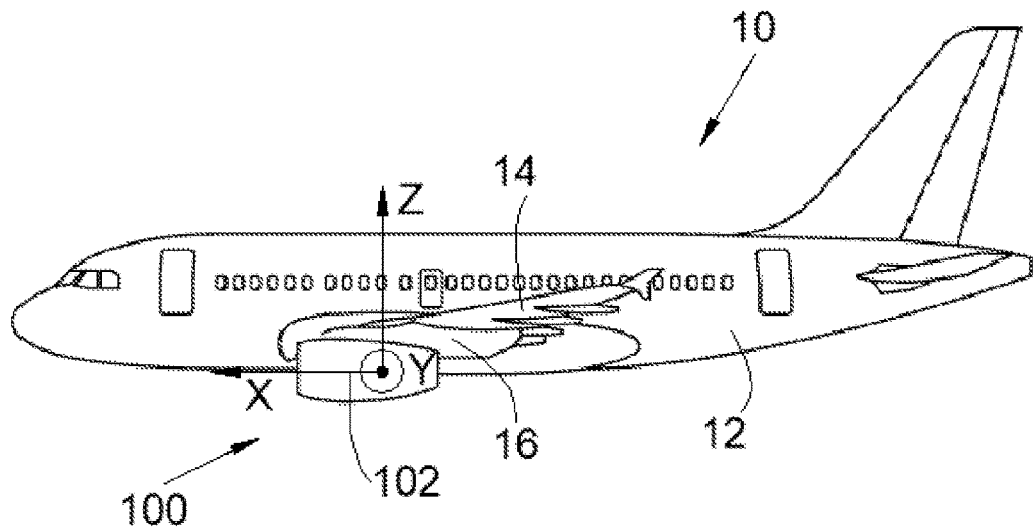
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
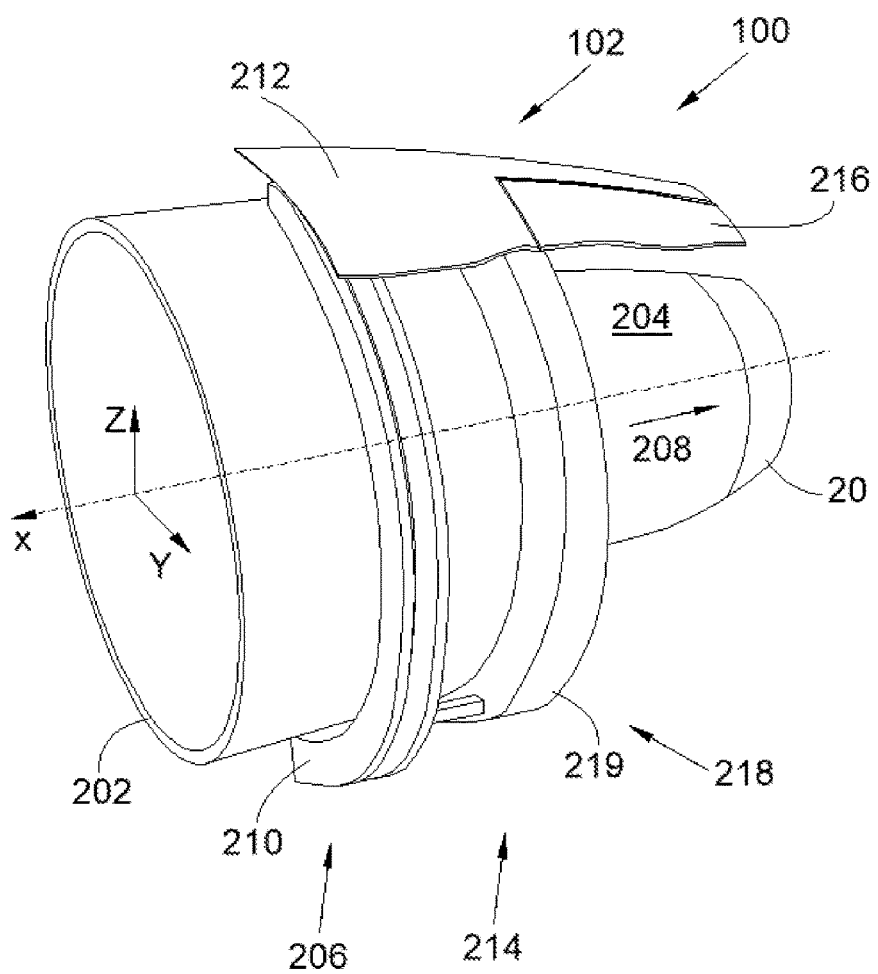
FIG. 2 is a perspective view of the turbofan according to the invention in the advanced and stowed position.
Figure 3:
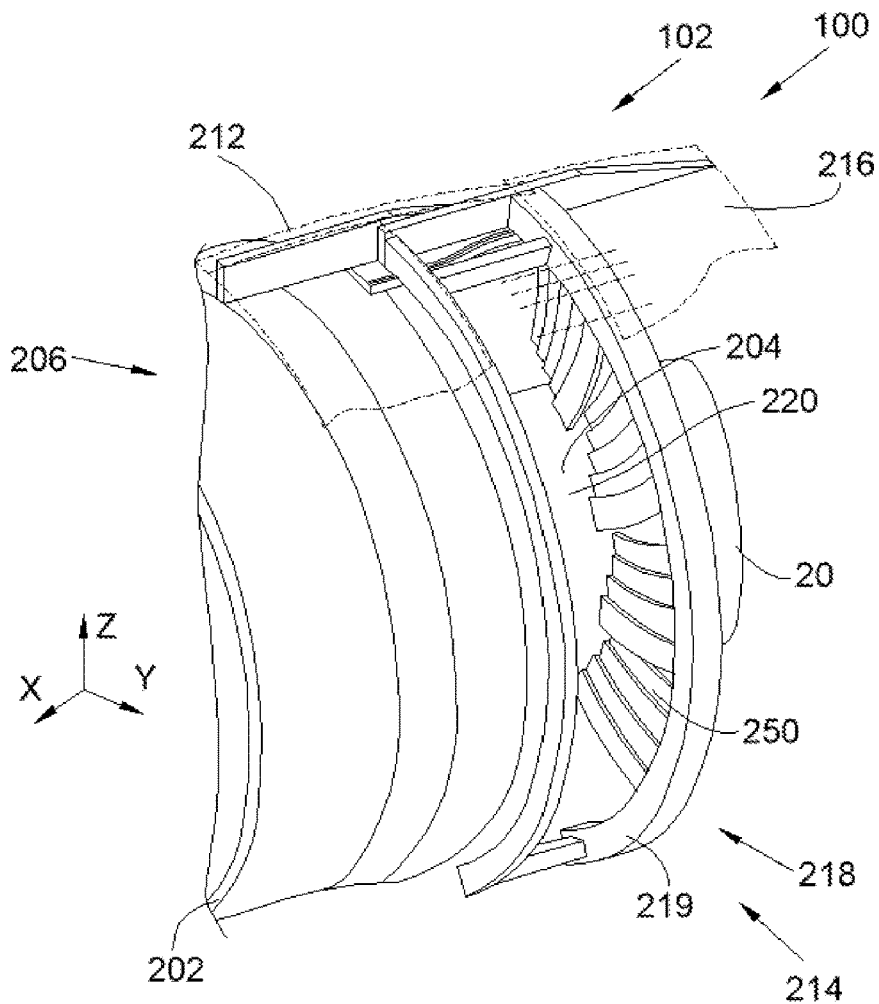
FIG. 3 is a perspective view of the turbofan according to the invention in the extended and deployed position.

FIG. 2 and FIG. 3 show the turbofan 100 which has a nacelle 102 and a motor 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively toward the front of the aircraft 10, Y denotes the transverse axis that is horizontal when the aircraft is on the ground, and Z denotes the vertical axis, these three directions X, Y and Z being mutually orthogonal.

Figure 4:
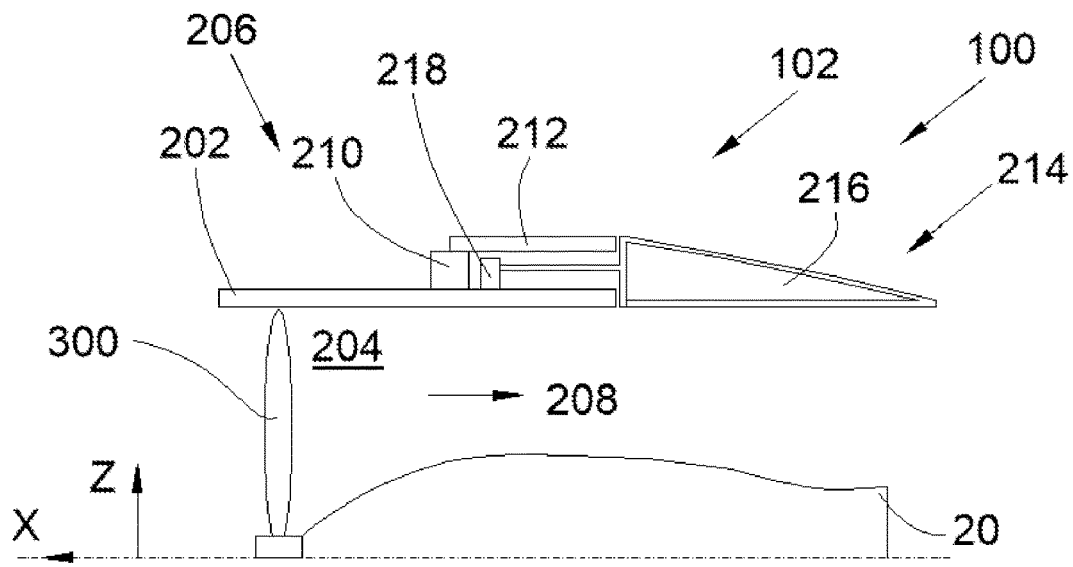
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the motor 20, a duct 204 in which flows a bypass flow 208 coming from the air intake through a fan 300, and which therefore flows in the flow direction from front to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and an extended position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the extended position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the extended position, the mobile cowl 216 and the fan casing 202, and the outer panels 212, are spaced apart from one another and define, between them, the open window 220 between the duct 204 and the exterior of the nacelle 102. That is to say, the air from the bypass flow 208 passes through the window 220 to end up outside the turbofan 100.

The slider 218 is made to translate by any appropriate means, such as, for example, slideways between the fixed structure 206 and the slider 218.

The nacelle 102 also comprises a set of actuators (not shown) that move the slider 218 in translation between the advanced position and the extended position and vice versa. Each actuator is controlled by a control unit, for example of the processor type, which controls the movements in one direction or in the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each one being mounted so as to be able to rotate on the slider 218 about an axis of rotation that, here, is generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block the duct 204.

The blades 250 are angularly offset from one to the next about the longitudinal axis X.

The number of blades 250, and the shape of each of these, depend on the dimensions of the turbofan 100 and on the width of each blade 250 in order that, in the deployed position, the blades 250 block the majority of the duct 204.

Passage from the stowed position to the deployed position is brought about by rotation of the blade 250 towards the interior of the engine 100.

The stowed position can be adopted when the slider 218 is in the advanced position or the extended position. The deployed position can be adopted only when the slider 218 is in the extended position.

The slider 218 also has a maneuvering system 400 which moves each blade 250 from the stowed position to the deployed position and vice versa.

Thus, operation comprises, starting from the advanced/stowed position, ordering activation of the actuators to move the slider 218 from the advanced position to the extended position. During this movement, the maneuvering system 400 moves the blades 250 from the stowed position to the deployed position.

Conversely, operation thus comprises, starting from the extended/deployed position, ordering activation of the actuators to move the slider 218 from the extended position to the advanced position. During this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

Figure 5:
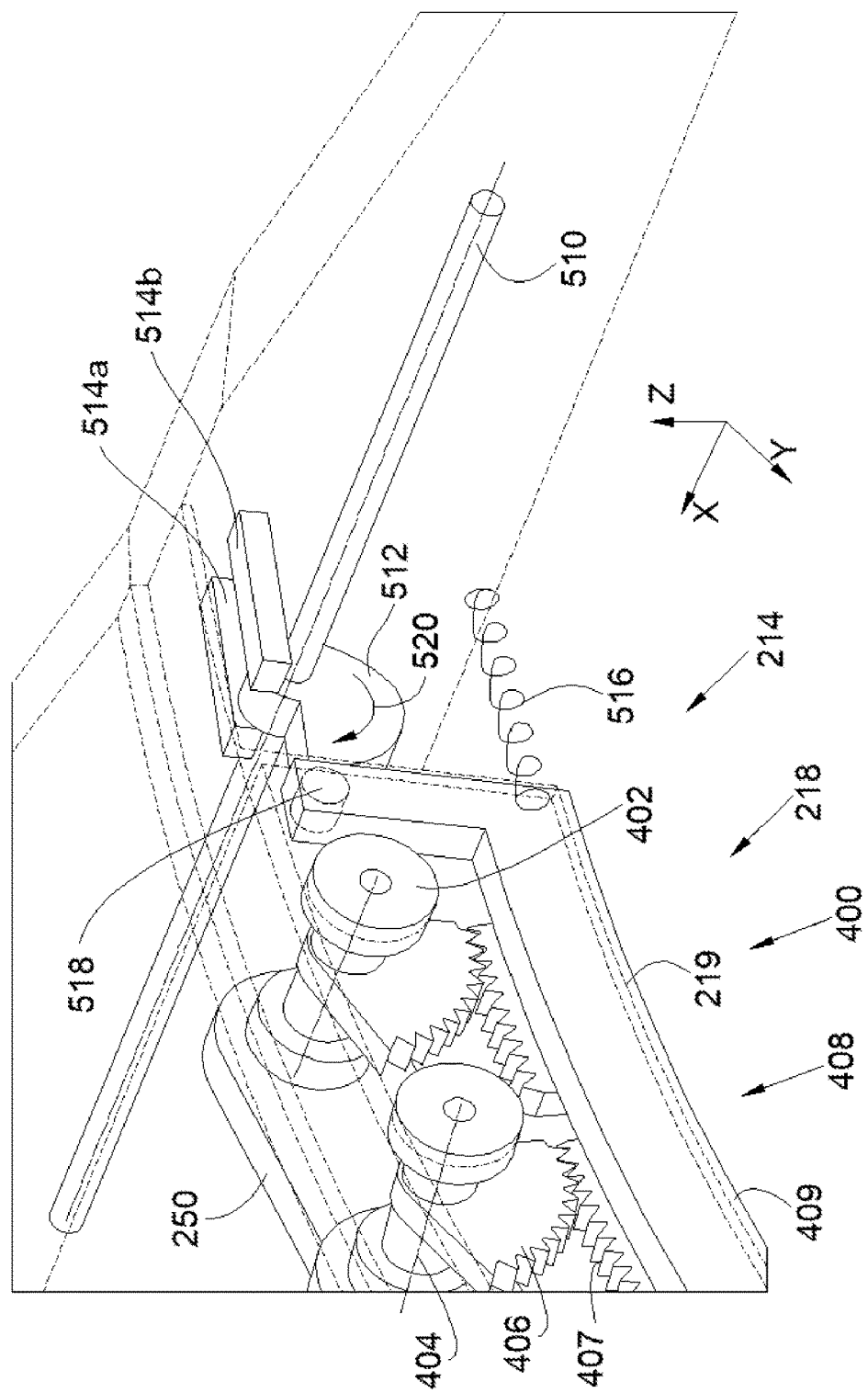
FIG. 5 is a perspective view of a maneuvering system according to the invention.

FIG. 5 shows the maneuvering system 400 on the mobile assembly 214, and more particularly on the slider 218, which is shown here as transparent, in dash-dotted lines.

For each blade 250, the maneuvering system 400 comprises a shaft 402 which is mounted so as to be mobile in rotation on the slider 218 about an axis of rotation 404, and on which the blade 250 is fixed. In FIG. 5, each blade 250 is truncated in order to facilitate understanding of the mechanism, and only two blades 250 are shown. The axis of rotation 404 is, in this case, generally parallel to the longitudinal axis X.

For each shaft 402, the maneuvering system 400 also comprises a toothed sector 406 that is fixed to the shaft 402 and is coaxial with the axis of rotation 404.

The maneuvering system 400 also comprises a toothed arc 408 whose axis is coaxial with the longitudinal axis X. The toothed arc 408 is mounted so as to be mobile in rotation on the mobile assembly 214, and more particularly on the slider 218, about the longitudinal axis X. In the embodiment of the invention shown in FIG. 5, the toothed arc 408 comprises a supporting plate 409 which, in this instance, is in the general shape of a crown and, for each toothed sector 406, a toothed sub-arc 407 fixed to the supporting plate 409, but it is also possible to provide a toothed arc that extends over all of the toothed sectors 406.

Each toothed sub-arc 407 is fixed to the supporting plate 409, for example by means of screw systems.

The teeth of the toothed arc 408, in this instance of each toothed sub-arc 407, mesh with the teeth of each toothed sector 406. Thus, a displacement in rotation of the toothed arc 408 causes rotation of each toothed sector 406 and thus of the associated blade 250.

Each blade 250 extends in a plane generally perpendicular to the longitudinal axis X.

The maneuvering system 400 also comprises a threaded rod 510 whose axis is parallel to the longitudinal axis X and which is mounted fixed on the fixed structure 206.

The maneuvering system 400 also comprises a cam 512 having a tapped hole screwed onto the threaded rod 510 and an outer face that is eccentric with respect to the axis of the tapped hole.

The cam 512 is also mounted fixed in translation with respect to the slider 218, that is to say, translation of the slider 218 causes the same translation of the cam 512. In the embodiment of the invention shown in FIG. 5, the cam 512 is in engagement between two contacts 514a-b secured to the slider 218, where an upstream contact 514a bears in planar fashion against a front face of the cam 512 and where a downstream contact 514b bears in planar fashion against a rear face of the cam 512. Of course, any other system for immobilizing in translation is possible.

The common screw pitch between the threaded rod 510 and the tapped hole is large enough that the displacement in translation of the cam 512 drives its rotation, for example, the 1000 mm screw pitch.

Thus, when the slider 218 moves in translation, the cam 512 moves likewise and, owing to its engagement with the threaded rod 510, it rotates about the axis of its tapped hole and of the threaded rod 510.

The outer surface of the cam 512 bears against a bearing face of the toothed arc 408 and, more particularly in this instance, of the supporting plate 409.

The maneuvering system 400 also comprises a return means 516 which presses the bearing face of the toothed arc 408 against the outer surface of the cam 512. In the embodiment of the invention shown in FIG. 5, the return means 516 is a tension spring which is fixed between the toothed arc 408, and, more particularly in this instance, of the supporting plate 409, and a part of the slider 218. Of course, any other return means is possible, such as, for example, a compression spring, by providing a suitable mounting.

Thus, when the rotation of the cam 512 tends to repel the supporting plate 409, the latter rotates about the longitudinal axis X, driving in rotation each toothed sub-arc 407 and therefore each toothed sector 406 and hence each blade 250 from a first position to a second position.

Conversely, when the cam 512 rotates in the opposite direction, it does not repel the supporting plate 409, which returns to its first position under the effect of the return means 516.

In the embodiment of the invention shown here, the first position is the stowed position as shown in FIG. 5, and the second position is the deployed position which is reached after a rotation represented by the arrow 520, but a reverse arrangement is also possible.

Thus, moving all of the blades 250 is relatively simple to implement and does not require actuators beyond those necessary for moving the slider 218.

In order to make it easier for the outer face of the cam 512 to slide against the bearing face of the toothed arc 408, the latter is equipped with a roller 518 (shown in dotted lines) that is mounted so as to be able to rotate freely on the toothed arc 408 about an axis parallel to the longitudinal axis X and that is arranged so as to roll on the outer face of the cam 512 when the latter moves in rotation.

In the embodiment of the invention shown in FIG. 5, the slider 218 comprises a U-shaped profile 219 that is coaxial with the longitudinal axis X and open towards the longitudinal axis X. The U-shaped profile 219 forms a cage inside which the toothed arc 408 is mounted so as to be able to move in rotation about the longitudinal axis X, and where the shafts 402 are mounted so as to be able to move in rotation through the walls of the U-shaped profile 219 about the axis of rotation 404.

The toothed arc 408 is guided in rotation with respect to the U-shaped profile 219 by any appropriate means, such as, for example, a system of grooves and studs sliding in the groove.

Figure 6:
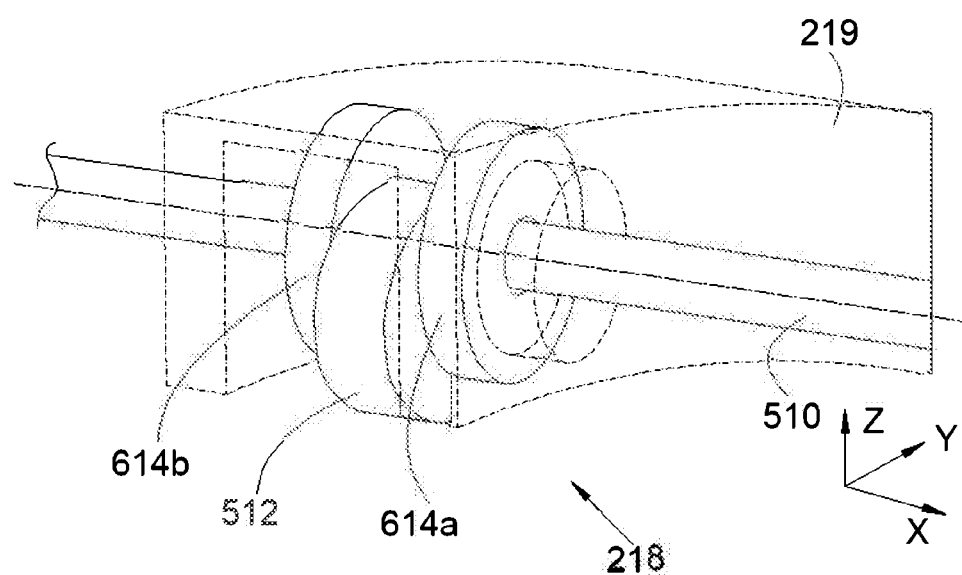
FIG. 6 is a perspective view of an immobilizing system according to a particular embodiment.

FIG. 6 shows another embodiment of the system for immobilizing the cam 512 in translation. In this embodiment, the immobilizing system comprises two thrust ball bearings 614a-b which are secured to the slider 218 and which are, in this instance, mounted fixed inside the U-shaped profile 219, which is shown as transparent in dash-dotted lines. The use of thrust ball bearings reduces friction.

Each thrust ball bearing 614*a-b* is threaded onto the threaded rod 510 and there is an upstream thrust ball bearing 614*a* that bears in planar fashion against a front face of the cam 512 and a downstream thrust ball bearing 614*b* that bears in planar fashion against a rear face of the cam 512.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising a motor and a nacelle, surrounding the motor, which comprises a fan casing, in which a duct for a bypass flow is delimited between the nacelle and the motor and in which a flow of air flows in a flow direction, the nacelle comprising:
a fixed structure fixed to the fan casing,
a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and an extended position in which the slider is positioned such that the mobile cowl is moved away from the fan casing to open a window between the duct and the exterior of the nacelle,
a plurality of blades, each one comprising a first end mounted to be mobile in rotation on the slider about an axis of rotation, and where the plurality of blades are circumferentially angularly offset from one another about the longitudinal axis, where each blade is mobile between a stowed position in which the blade is outside the duct and a deployed position in which the blade is across the duct,
an assembly of actuators causing the slider to move between the advanced position and the extended position, and vice versa, and
a maneuvering system configured to move each blade from the stowed position to the deployed position and vice versa, where the maneuvering system comprises:
for each blade, a shaft mounted to be mobile in rotation on the slider about the axis of rotation which is parallel to the longitudinal axis, the blade is fixed to the shaft,
for each shaft, a toothed sector that is fixed to the shaft and is coaxial with the axis of rotation,
a toothed arc that is coaxial with the longitudinal axis, mounted to be mobile in rotation on the slider about the longitudinal axis, where teeth of the toothed arc mesh with the teeth of each toothed sector, and where the toothed arc has a bearing face,
a threaded rod whose axis is parallel to the longitudinal axis and which is mounted fixed on the fixed structure,
a cam having a tapped hole screwed onto the threaded rod and an outer face, where the cam is mounted fixed in translation with respect to the slider, and where the outer face of the cam bears against the bearing face, and
a return means which presses the bearing face of the toothed arc against the outer face of the cam, wherein rotation of the cam pushes the outer face against the bearing face to rotate the toothed arc about the longitudinal axis.

2. A turbofan according to claim 1, wherein the return means is a tension spring which is fixed between the toothed arc and the slider.

3. The turbofan according to claim 1, wherein the toothed arc is equipped with a roller that is mounted to be able to rotate freely on the toothed arc about an axis parallel to the longitudinal axis and that is arranged to roll on the outer face of the cam when the cam moves in rotation.

4. The turbofan according to claim 1, further comprising an upstream contact and a downstream contact that are secured to the slider, and wherein the upstream contact bears in planar fashion against a front face of the cam and the downstream contact bears in planar fashion against a rear face of the cam.

5. The turbofan according to claim 1, further comprising an upstream thrust ball bearing that bears in planar fashion against a front face of the cam and a downstream thrust ball bearing that bears in planar fashion against a rear face of the cam, wherein each thrust ball bearing is secured to the slider, and wherein each thrust ball bearing is threaded onto the threaded rod.

6. An aircraft comprising at least one turbofan according to claim 1.

* * * * *